United States Patent [19]
White et al.

[11] Patent Number: 6,154,680
[45] Date of Patent: Nov. 28, 2000

[54] CONTROL SYSTEMS AND METHODS UTILIZING OBJECT ORIENTED HARDWARE ELEMENTS

[75] Inventors: H. Philip White; Thomas P. Quinn, both of Temecula; James B. Quinn; John F. Stine, both of Murrieta, all of Calif.

[73] Assignee: Zone Automation Inc., Temecula, Calif.

[21] Appl. No.: 08/946,231

[22] Filed: Oct. 7, 1997

[51] Int. Cl.⁷ ..................................................... G05B 11/01
[52] U.S. Cl. ................................. 700/19; 700/20; 700/24; 700/25; 700/86; 361/622; 361/686; 361/731; 361/797
[58] Field of Search ..................................... 361/686, 731, 361/797, 622; 700/19, 86, 20, 24, 25

[56] References Cited

U.S. PATENT DOCUMENTS

| | | | |
|---|---|---|---|
| 4,558,914 | 12/1985 | Prager et al. | 339/75 R |
| 5,410,717 | 4/1995 | Floro | 395/800 |
| 5,479,618 | 12/1995 | Van De Steeg et al. | 364/167.01 |
| 5,515,239 | 5/1996 | Kamerman et al. | 361/727 |
| 5,530,643 | 6/1996 | Hodorowski | 364/191 |
| 5,541,810 | 7/1996 | Donhauser et al. | 361/868 |
| 5,544,008 | 8/1996 | Dimmick et al. | 361/684 |
| 5,646,816 | 7/1997 | Alden et al. | 361/622 |
| 5,777,874 | 7/1998 | Flood et al. | 364/187 |

*Primary Examiner*—Paul P. Gordon
*Assistant Examiner*—Ramesh Patel
*Attorney, Agent, or Firm*—Lyon & Lyon LLP

[57] ABSTRACT

Computer-based industrial control systems and methods employing object oriented hardware elements. An object oriented hardware element may comprise a processor core coupled one side to a universal real-world interface circuit, and on the other side to an open bus interface. In a preferred embodiment, the open bus interface provides downloading software programming objects to the microprocessor core. A computer-based control system in accordance with the present invention may comprise a personal computer or central processing unit coupled to a communications network, at least one zone interface module coupled to the communications network and to an open bus, at least one zone device module coupled to the open bus and, if required, one or more zone processor modules coupled to the open bus. Software object may be downloaded from the personal computer or central processing unit to the various modules to achieve modular, exception-based, distributively intelligent (MEDI) I/O control within the system.

4 Claims, 15 Drawing Sheets

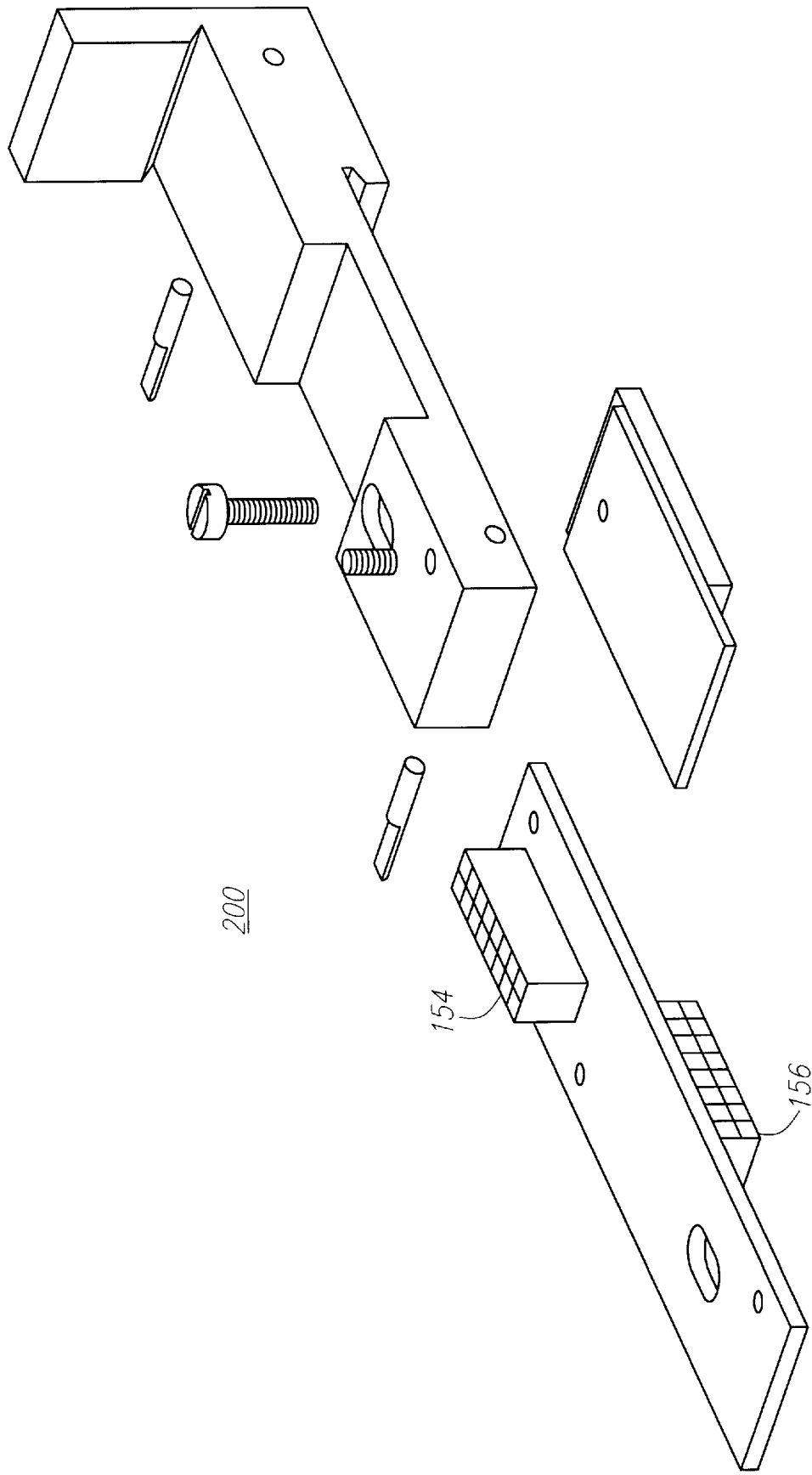

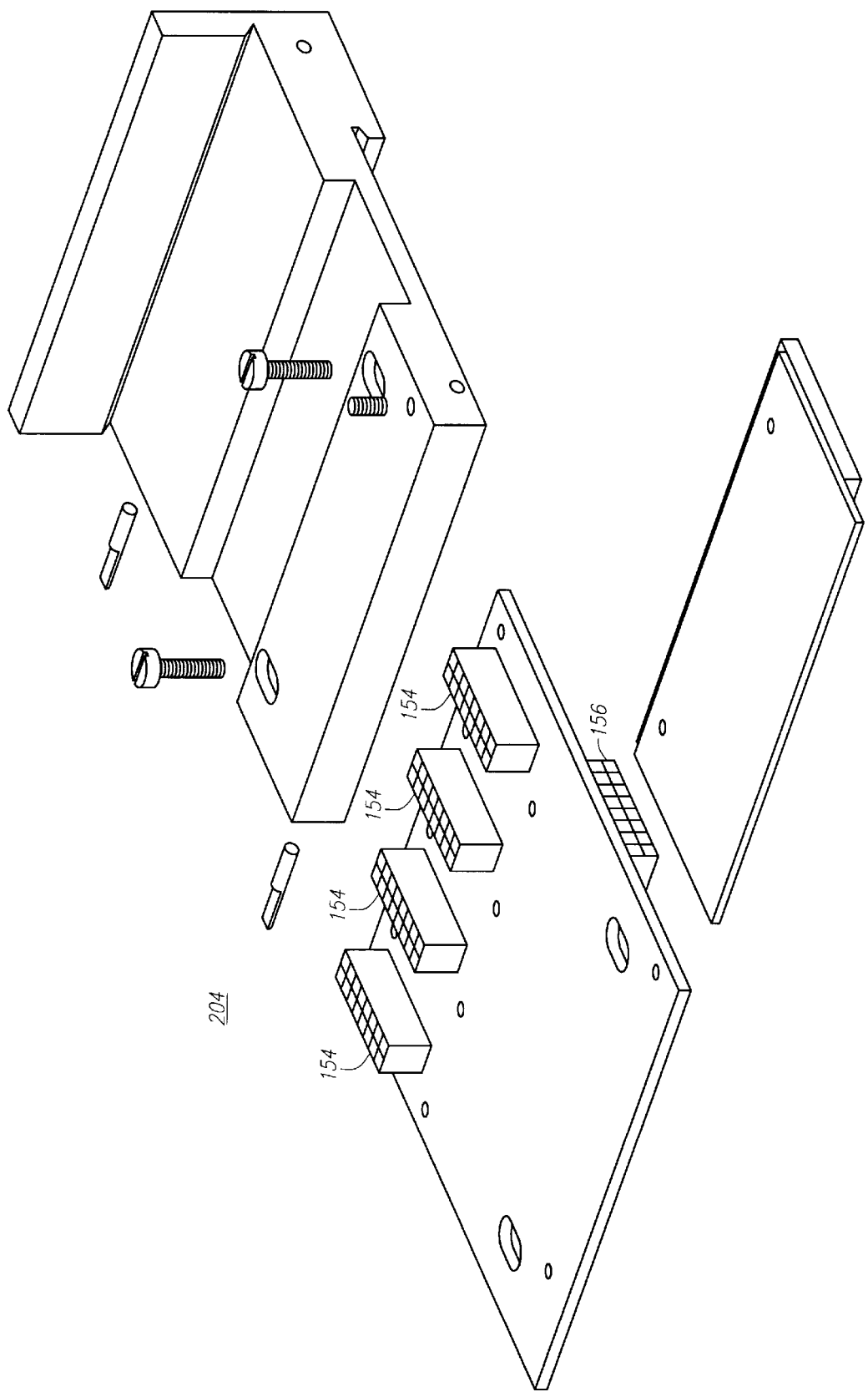

CONTROL SYSTEMS AND METHODS UTILIZING OBJECT ORIENTED HARDWARE ELEMENTS

FIELD OF THE INVENTION

The present invention relates generally to industrial, computer-based control systems and, more particularly, to computer-based control systems and methods utilizing object oriented hardware elements.

BACKGROUND

Recently, substantial attention has been directed toward the development of industrial, computer-based control systems and, further, toward the development of object oriented software products for use within such systems. For example, conventional control systems typically include a central processing unit (CPU) and a multitude of input/output (I/O) devices that are coupled to, and communicate with, the central processing unit (CPU) to monitor and/or control devices and processes within a selected physical or "real world" environment.

Despite the fact that computer-based control systems have been utilized for some time, much still needs to be done to truly unlock the potential of those systems in the modern industrial environment. To understand why this is so, it may be helpful to consider the structure, operation and inherent limitations of computer based control systems that are currently available. Accordingly, several conventional control system architectures are described below and illustrated in FIGS. 1(a)–1(c).

Programmable Logic Controllers

Turning now to FIG. 1(a), programmable logic controllers are well known in the art and generally comprise a power supply, a central processing unit (CPU) and a plurality of input/output (I/O) cards. The I/O cards generally are connected to the CPU via a communications link and rely on the CPU for all control functions. For this reason, the I/O cards are often referred to as "dumb" or "unintelligent" units. Control programs for implementing all of the I/O functions required by such systems are stored in memory associated with the central processing unit (CPU) and are executed by the central processing unit (CPU). Thus, it will be appreciated by those skilled in the art that typical control systems utilizing programmable logic controllers generally require centralized processing (i.e., one processor that executes all control functions); provide little, if any, distributed control; and are designed from an application-centric rather than object-centric orientation.

Distributed Control Systems

Turning now to FIG. 1(b), distributed control systems (DCS), despite their name, are fundamentally undistributed. Distributed control systems work in a manner quite similar to programmable logic controllers. Moreover, as was the case with programmable logic controllers, a central processing unit (CPU) is responsible for virtually all system control functions. However, in the case of a distributed control system, remote sensors and remote I/O units exchange data with the CPU via extended "home run" wiring or bus networks. In many ways, distributed control systems are the "mainframes" of industrial control systems. They are used, for the most part, in large applications where programmable logic controllers lack the requisite programming power. Some disadvantages of conventional distributed control systems again include the required use of centralized processing, the use of non-intelligent I/O elements, substantial limits on the amount of processing that may be distributed within the system, and the use of application-centric rather than object-centric design features.

Computer Based Control Systems

Turning now to FIG. 1(c), computer based control systems may generally be viewed as utilizing the power and flexibility of general purpose computers (typically PCs) for control. Those skilled in the art will appreciate that these systems are typically utilized as programmable logic controller and distributed control system replacements. In short, the proprietary processor of the PLC or DCS system is replaced with a more standard PC processor. These systems have the benefit of all available technology for general purpose computing (modern operating systems, languages, object oriented design techniques, etc.) but retain many of the limitations of their predecessors. These disadvantages include, for example, the requirement of centralized processing, limited distributive control, and an inability to utilize object oriented technology at the I/O level.

In view of the foregoing, it is believe that a need exists for a new type of computer-based control system for industrial applications. It is also believed that those skilled in the art would find a control system that provides for truly distributed processing, the use of intelligent I/O elements, and object oriented design methodologies at the I/O level to be quite useful.

SUMMARY OF THE INVENTION

The present invention is directed to improved computer-based control systems for industrial applications, to object oriented hardware elements that may be used within such systems, and to methods of implementing control systems using object oriented hardware elements.

In one particularly innovative aspect, the present invention is directed toward a modular, exception-based, distributively intelligent (MEDI) architecture for computer-based control systems. Such an architecture provides a hierarchy of control objects, each with its own needs in terms of real world interaction and processing power. Such an architecture also allows for each control object to physically reside as close as possible to devices being controlled and is designed to enhance the utilization of control objects at the I/O level. In short, the MEDI architecture is object-centric, rather than application-centric, and allows control systems to be developed, modified and expanded with minimal waste and expense.

In one preferred form, a computer-based control system implemented using a MEDI architecture in accordance with the present invention may comprise at least one personal computer coupled to a communications network, a plurality of zone interface modules coupled to the communications network and to respective open bus circuits, a plurality of zone processor modules coupled to the respective open bus circuits, and a plurality of intelligent I/O modules coupled to the open bus circuits, such that programming objects may be downloaded from the personal computer to the zone interface modules, the zone processor modules and the intelligent I/O modules to achieve distributive, object oriented control within the control system.

Those skilled in the art will appreciate that the MEDI architecture of the present invention provides several advantages not found in conventional computer based control systems. For example, the modularity of the MEDI architecture enables users to control system costs by constructing and packaging control systems that are tailored to current system design goals without the need to over-design for later system expansion or modification. In addition, the exception based reporting utilized within the MEDI architecture efficiently utilizes I/O bandwidth, enabling the use of low cost, serial, peer-to-peer control and/or communication networks between components. Finally, the use of distributive intelligence (particularly at the I/O level) allows control to be virtualized or spread-out across a network or system, enabling real-time control to be spread among a set of processors each responsible for a selected device object, process object or group of objects. Stated somewhat differently, a control system employing a MEDI architecture in accordance with a preferred form of the present invention is designed from an object-centric perspective to maximize the advantages achieved through the use of object oriented programming, while minimizing overall system costs and providing for efficient system modification or expansion.

In a second innovative aspect, the present invention is directed to the implementation and utilization of object oriented hardware elements. In one preferred form, these elements comprise a processor core for receiving and executing object-oriented programming objects, a universal input/output interface for enabling the processor core to interact with at least one field element, and an open bus interface for enabling the processor core to communicate with a control network. The universal input/output interface may comprise, for example, one or more digital or analog inputs, one or more digital or analog outputs or, if desired, a combination of digital and analog inputs and/or outputs. Thus, it will be appreciated by those skilled in the art that an object oriented hardware element in accordance with the present invention may be used to effect any of a virtually unlimited number of control functions, provided that the control functions are definable and/or may be modeled by executable programming code (preferably, object oriented code).

In still another innovative aspect, the present invention is directed to the use of object oriented hardware within control systems and to methods of implementing control systems using a MEDI architecture and/or object oriented hardware elements.

Other objects and features of the present invention will become apparent from consideration of the following description taken in conjunction with the accompanying drawings.

BRIEF DESCRIPTION OF THE DRAWINGS

FIG. 9(a) is an exploded view of a one-position zone modular rack element in accordance with the present invention.

FIG. 9(c) is an exploded view of a four-position zone modular rack element in accordance with the present invention.

DESCRIPTION OF PREFERRED EMBODIMENTS

Figure 1A:
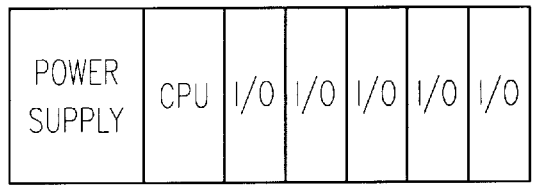
FIG. 1(a) is a block diagram illustrating a conventional programmable logic control architecture for use in industrial control systems.
Figure 1B:
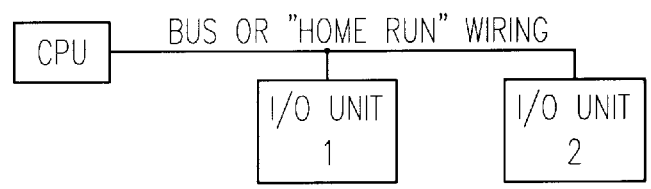
FIG. 1(b) is a block diagram illustrating a conventional distributed control system architecture for use in industrial control systems.
Figure 1C:
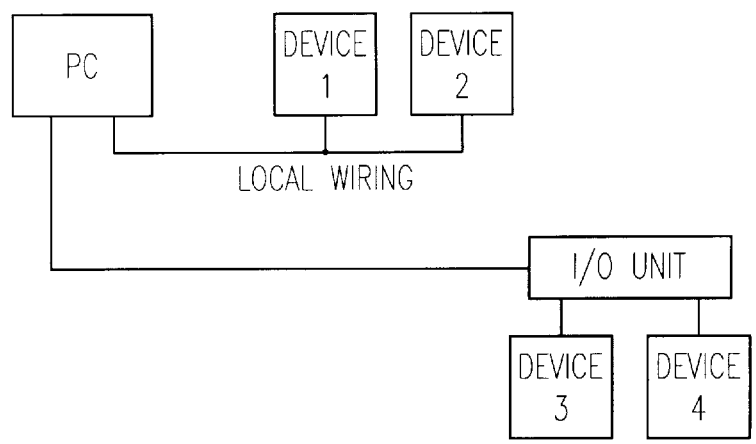
FIG. 1(c) is a block diagram illustrating a conventional computer based control architecture for use in industrial control systems.

In an effort to highlight various embodiments and innovative aspects of the present invention, a number of subheadings are provided in the following discussion. In addition, where a given structure appears in several drawings, that structure is labeled using the same reference numeral in each drawing.

General Description—MEDI System Architecture

Figure 2A:
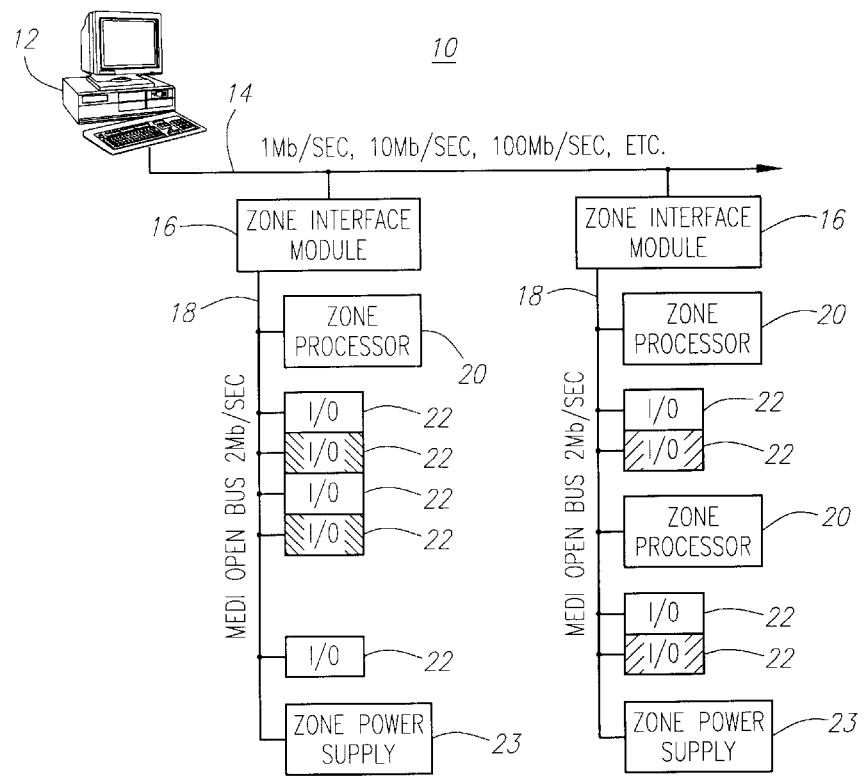
FIG. 2(a) is an illustration of a modular, exception-based, distributively intelligent (MEDI) I/O system in accordance with one preferred form of the present invention.
Figure 2B:
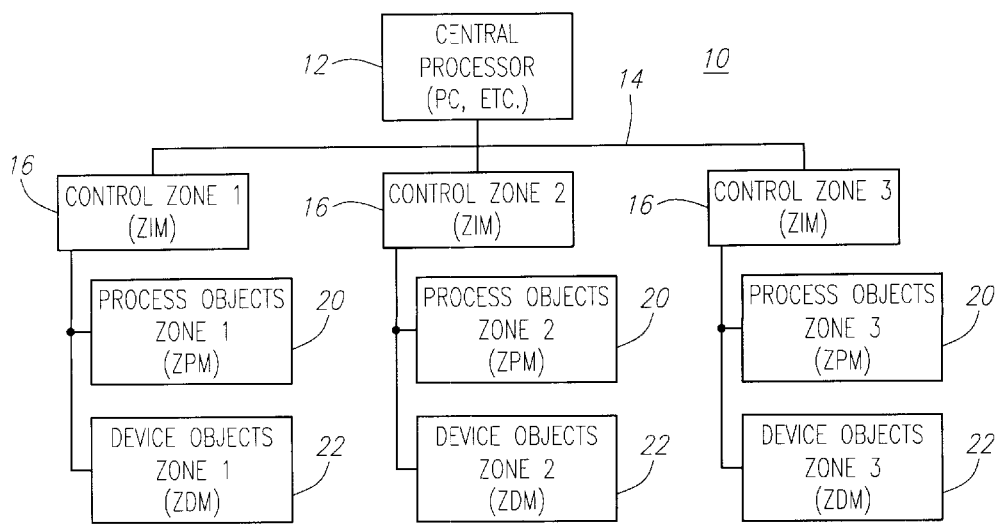
FIG. 2(b) is a block diagram illustrating a modular, exception-based, distributively intelligent (MEDI) I/O system architecture in accordance with a preferred form of the present invention.

Turning now to the drawings, FIGS. 2(a) and 2(b) are block diagrams illustrating a modular, exception-based, distributively-intelligent (MEDI) I/O system architecture in accordance with a preferred form of the present invention. As shown, a MEDI I/O based control system 10 may comprise a personal computer 12 coupled to a communications network 14, a plurality of zone interface modules 16 coupled to the communications network 14 and to respective open bus circuits 18, a plurality of zone processor modules 20 coupled to the respective open bus circuits 18, and a plurality of intelligent I/O modules 22 coupled to the open bus circuits 18, such that programming objects may be downloaded from the personal computer 12 to the zone interface modules 16, the zone processor modules 20 and the intelligent I/O modules 22 to achieve distributive, object oriented control within the control system 10.

As is readily seen from FIG. 2(a), the MEDI I/O based control system 10 uses a zone concept to distribute I/O control functions within the system. Moreover, the I/O functions of a given control application are broken into different zones based upon the requirements of the application, such that each zone may be connected either directly or through a standard control network (i.e., MEDI open bus 18 and zone interface module 16) to the central processing unit 12 (or personal computer) of the system 10. Further, selected zones within the MEDI I/O based control system 10 may be connected to other zones forming a hierarchical tree of I/O. Zones may also be constructed using centralized, remote-group, single-point packaging or a combination thereof. It may also be noted that each zone is preferably provided with a user defined power supply 24 to power the circuitry of the various MEDI I/O components within a defined zone.

Turning, in particular, to FIG. 2(b) a MEDI I/O control system 10 in accordance with the present invention preferably divides a control application into a hierarchy with three major levels, a central processor level, process object level and device object level. A "zone" of I/O functions may be formed by connecting a zone interface module 16 to the personal computer or central processing unit 12 via a supported communications link or conventional network 14 (i.e., Fieldbus, Ethernet, Internet, ATM, USB, etc.). The utilization of such communication links and networks is well known in the art and, thus, is not discussed in detail herein. Within each zone, a zone interface module 16, one or more zone processing modules 20 and one or more zone device modules 22 are interconnected via a MEDI open bus 18, preferably having a bit transmission rate of at least 2 Mb/sec. The MEDI open bus 18 may be implemented via a Z-Net (an implementation of ARCnet) and in a manner well known in the art, thus allowing the components within a defined zone to communicate in an effectively free manner without requiring intervention from the CPU 12 or affecting the available bandwidth on the communications link 14.

The central processor level (i.e. CPU or PC 12) resides at the top of the control hierarchy and has the task of managing overall applications. However, as has been pointed out above, the implementation of actual process and device objects reside elsewhere (i.e., at the process object and device object levels). This offloads work from the CPU or PC 12 and minimizes I/O state traffic.

The process object level represents the first level of decomposition of the control application. Process objects may be viewed, for example, as objects that reside over or control other device or process objects, and process objects generally have an interface allowing direct interaction with the central processor level (i.e., CPU or PC 12) via a zone interface module 16. This allows the central processor level of an application to deal with each process object in an abstract manner (i.e., not caring about all of the I/O being manipulated and/or algorithms being run within the process object).

Zone processor modules, the implementation of which is discussed in more detail below, are the primary home for process objects, and zone processor modules are preferably designed to handle the needs of many device and other process objects simultaneously. Nonetheless, in accordance with the MEDI I/O architecture of the present invention, if the process object requirements for a particular zone of I/O exceed the capacity of a single zone processor module 16, additional zone processor modules 16 may be added to the zone, as shown in FIG. 2(a).

The device object level is the next and, preferably, lowest level of decomposition of a control application. Device objects are models of an actual device under control, for example, a temperature controller, cylinder control, valve control, etc. The device object level is implemented using zone device modules 22, and each zone device module 22 has an interface (i.e., connection to the MEDI open bus 18) that allows the overall application or a monitoring process object (zone processor module 16) to manipulate it.

Zone device modules, the implementation of which is described in more detail below, are provided with the processing power necessary to execute device object tasks, and a "real-world interface" designed to make the zone device module a useful platform for a device object. In short, each zone device module 22 is charged with accurately representing the field element or device that is attached thereto.

In view of the foregoing, those skilled in the art will appreciate that a MEDI I/O system architecture in accordance with the present invention provides several advantages over existing control system architectures. For example, a MEDI I/O based control system is substantially more scalable than conventional control systems. One reason for this is that an increase in the number of zone processor modules 20 and/or zone device modules 22 to a control system 10 in accordance with the present invention will not substantially increase the requirements placed upon the central processor 12. This is so because the central processor 12 in a MEDI I/O system coordinates activities within one or more zones rather than controlling those activities directly. In addition, those skilled in the art will realize that continuous improvement or expansion is possible within MEDI I/O based systems without requiring a complete system overhaul or "forklift" upgrade. For those not skilled in the art, a "forklift" upgrade occurs when the I/O needs of a given system can no longer be addressed by the resident processing unit of the system, thus necessitating the purchase of an entirely new system and the discarding of the components of the old system. Finally, those skilled in the art will appreciate that, unlike conventional systems, a MEDI I/O control system minimizes the bandwidth required to communicate I/O state data to the central processing unit. The central processing unit is provided with signals indicating that events have or have not occurred, and is not required to engage in constant polling of I/O devices to determine for itself when an event has occurred.

General Description—Object Oriented Hardware Elements

Figure 3A:
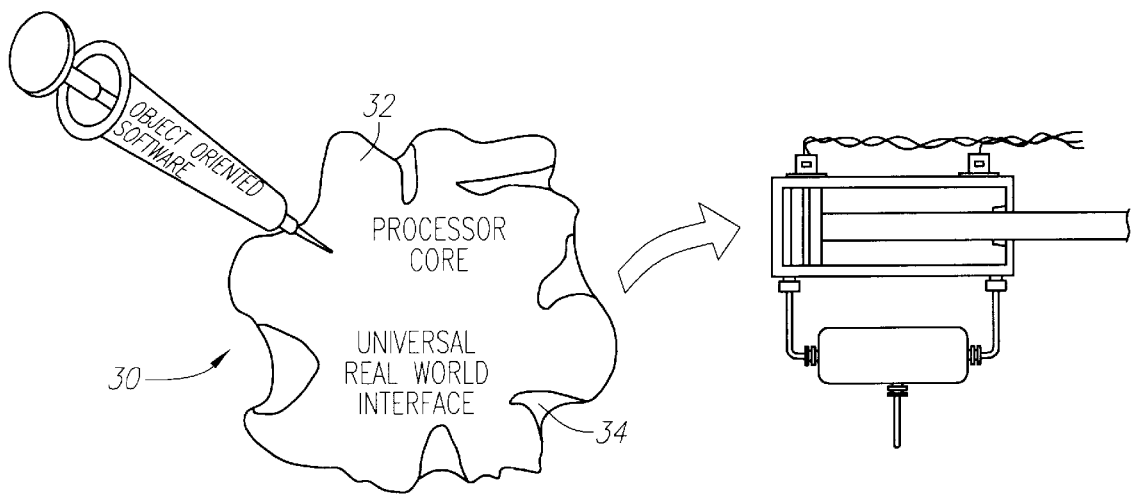
FIG. 3(a) provides a conceptual illustration of how an element of object oriented hardware in accordance with the present invention may be injected with a software object to implement a control function within a MEDI I/O based control system.
Figure 3B:
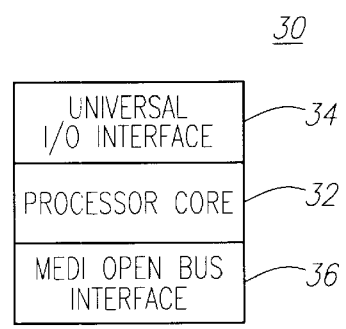
FIG. 3(b) provides an illustration of a conceptual model of an element of object oriented hardware.

Turning now to FIGS. 3(a) and 3(b), an object oriented hardware element in accordance with the present invention may be viewed as an intelligent piece of hardware that may be molded by software to perform various domain specific functions. Stated differently, an object oriented hardware element may be viewed as a hardware container for software objects. Basically, each element of object oriented hardware 30 comprises a central processing core 32 coupled on one side to a universal, "real-world" interface 34, and on the other side to a MEDI open bus interface 36. The attachments (universal, real-world interface 34 and MEDI open bus interface 36) connect the processor core 32 to both the outside world of I/O or, more specifically, to field elements within the physical world and to the common control network (MEDI open bus 18) that is shared by all MEDI compatible products.

The processor core 32 is provided with a MEDI basic input/output system (BIOS), and the BIOS enables the downloading of MEDI real-time operating systems (i.e., VB, embedded JAVA, etc.). The establishment of an open porthole (MEDI open bus protocol) is also provided. Through the MEDI open bus protocol the operating system enables a user defined software object (or applet) to be downloaded into the processor core 32 and executed. It will be appreciated that each component of the MEDI I/O system 10 is constructed using the conceptual model illustrated in FIG. 3(*b*).

Preferred Implementation of a Zone Interface Module

Figure 4:
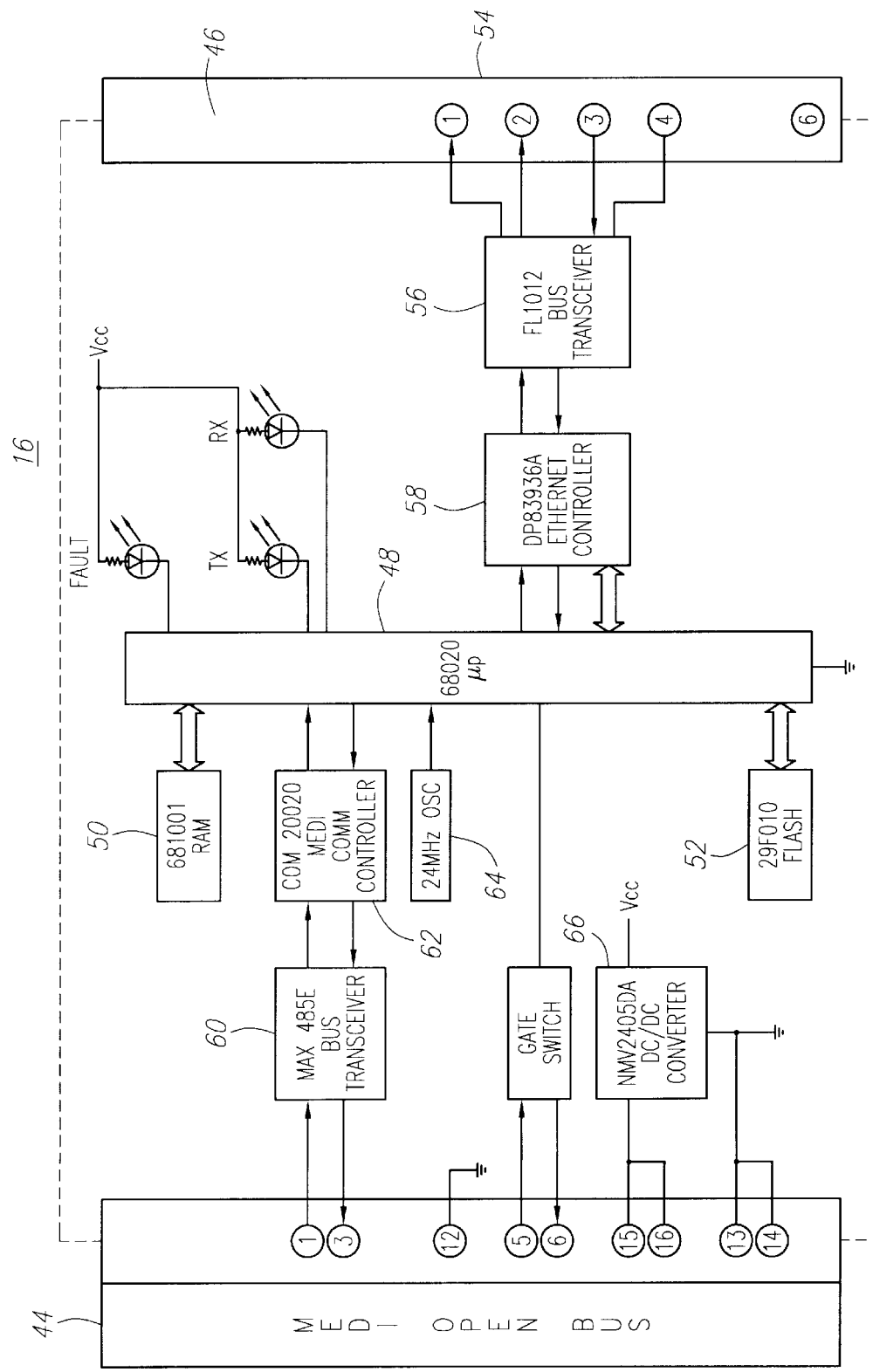
FIG. 4 is a block diagram illustrating the components of a zone interface module in accordance with a preferred form of the present invention.

Turning now to FIG. 4, a zone interface module 16 in accordance with the present invention may comprise a processor core 42 coupled on one side to a MEDI open bus interface circuit 44 and on the other side to an ethernet interface network 46. The processor core 42 preferably comprises a 68020 microprocessor 48, RAM 50 and flash memory 52. The ethernet interface network 46 includes an Ethernet bus connector 54, bus transceiver 56 and ethernet controller 58. The MEDI open bus interface circuit 44 includes a MEDI bus connector 44, bus transceiver 60 and MEDI communications controller 62. A 24 MHZ oscillator 64 is coupled to the microprocessor 48 and provides a clock signal, and a DC/DC converter 66 is provided to supply power (Vcc) to the microprocessor 48.

Preferred Implementation of a Zone Processor Module

Figure 5:
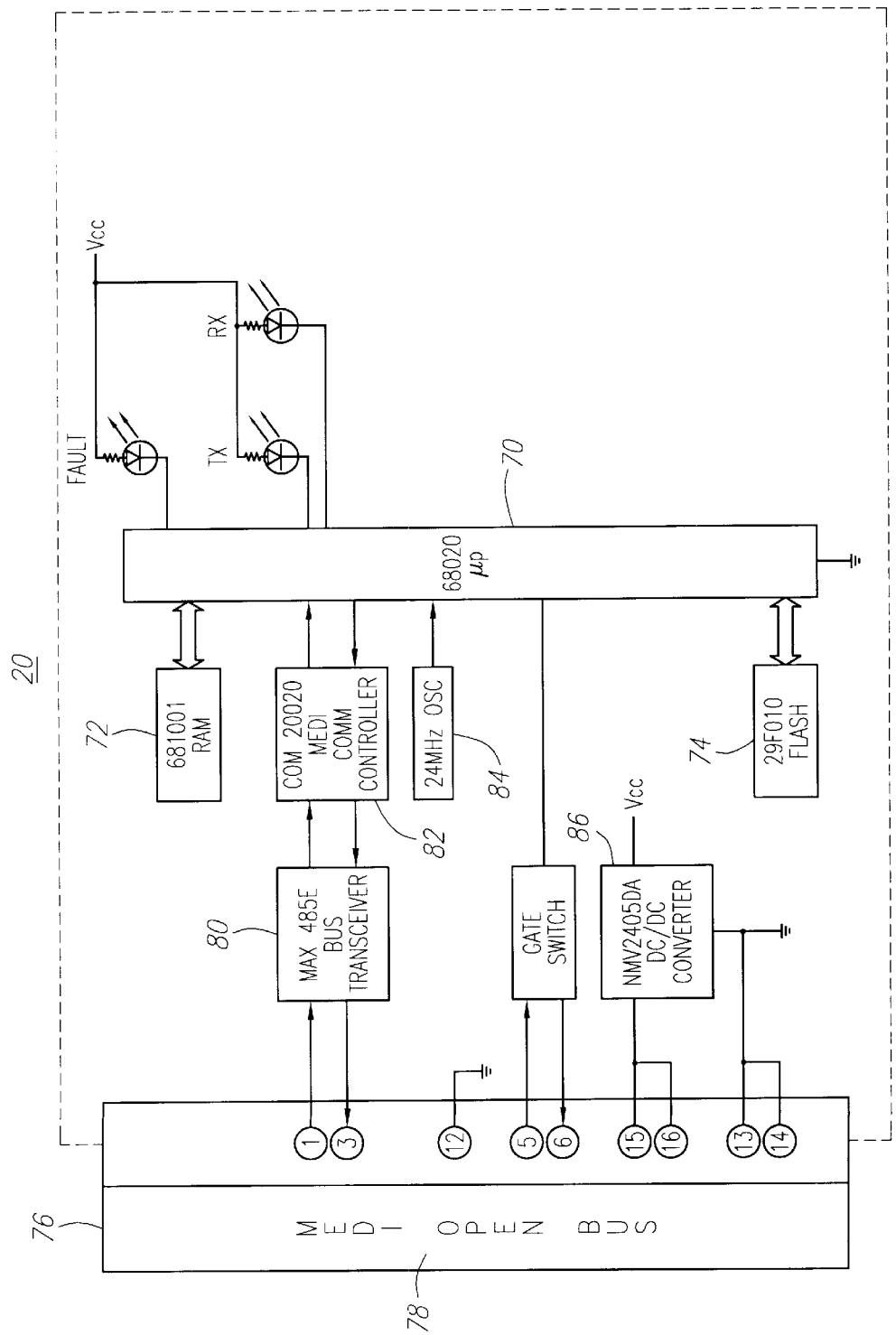
FIG. 5 is a block diagram illustrating the components of a zone processor module in accordance with the present invention.

Turning now to FIG. 5, a zone processor module 20 in accordance with the present invention preferably comprises a microprocessor core, including a 68020 microprocessor 70, RAM 72 and flash memory 74, that is coupled to a MEDI I/O interface circuit 76. The MEDI open bus interface circuit 76 includes a MEDI bus connector 78, bus transceiver 80 and MEDI communications controller 82. A 24 MHz oscillator 84 is coupled to the microprocessor 70 and provides a clock signal, and a DC/DC converter 86 is provided to supply power (Vcc) to the microprocessor 70.

Preferred Implementation of a Zone Device Module

Figure 6A:
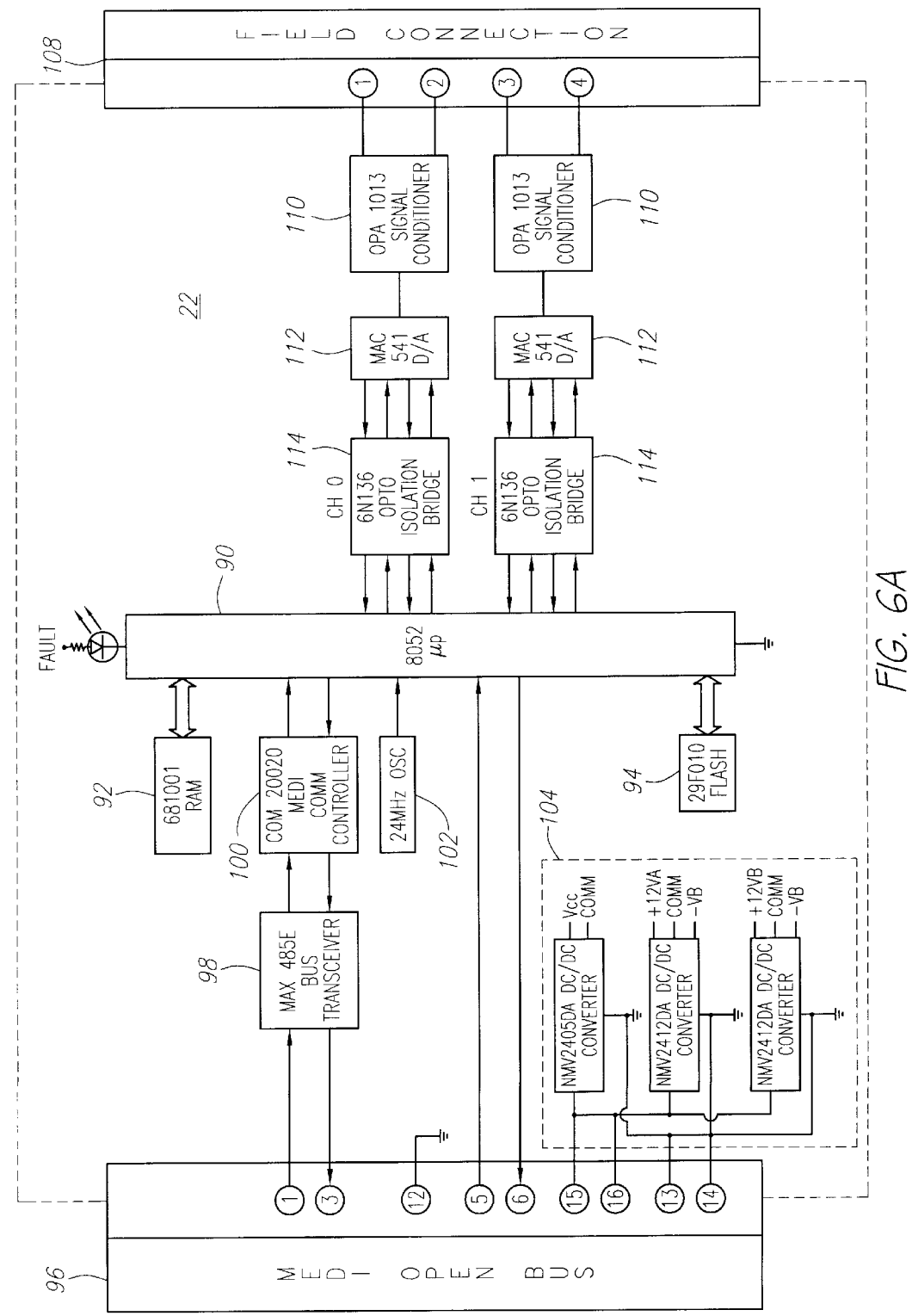
FIG. 6(a) is a block diagram illustrating the components of a zone device module having an analog output functionality.
Figure 6B:
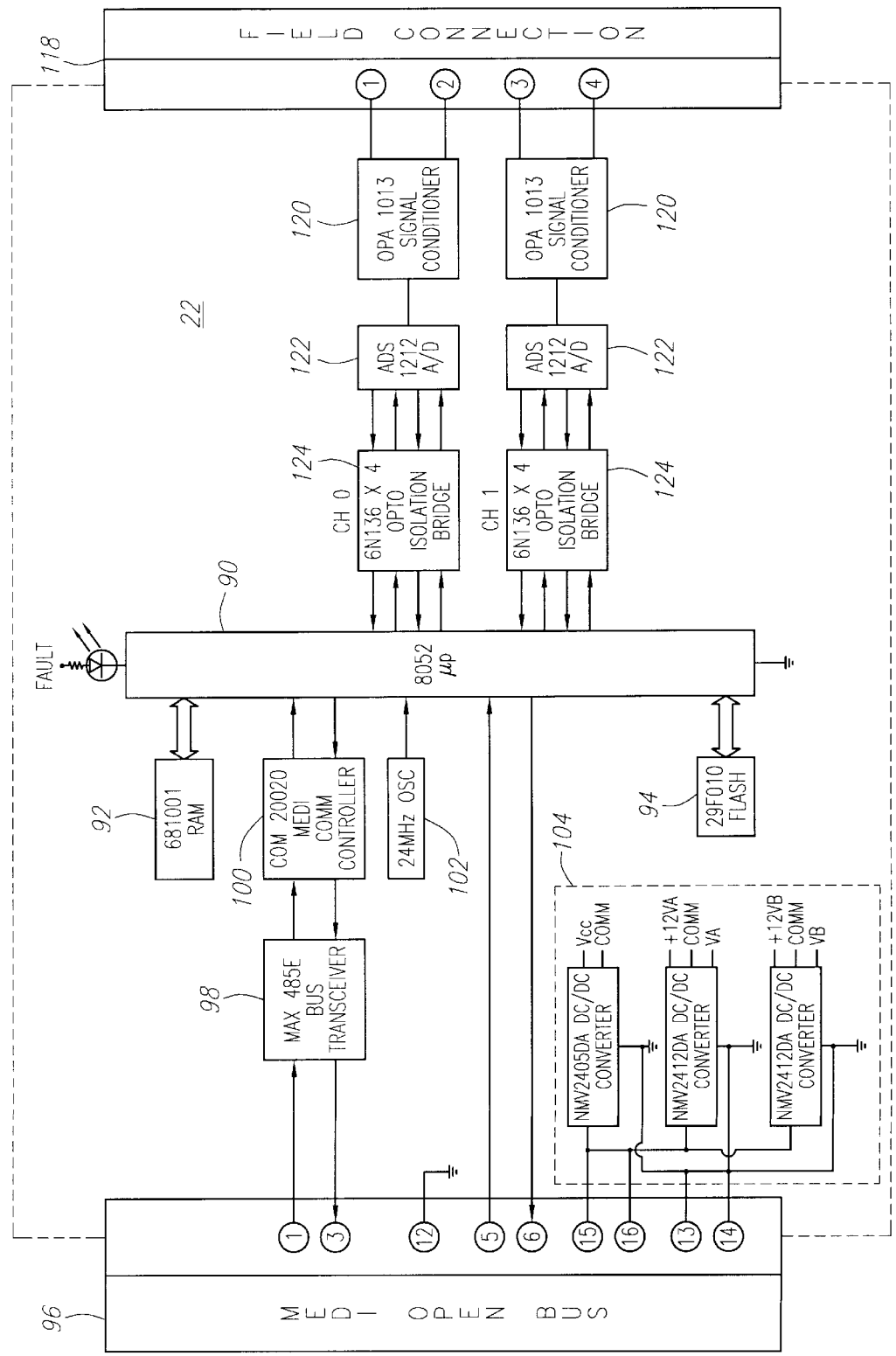
FIG. 6(b) is a block diagram illustrating the components of a zone device module having an analog input functionality.
Figure 6C:
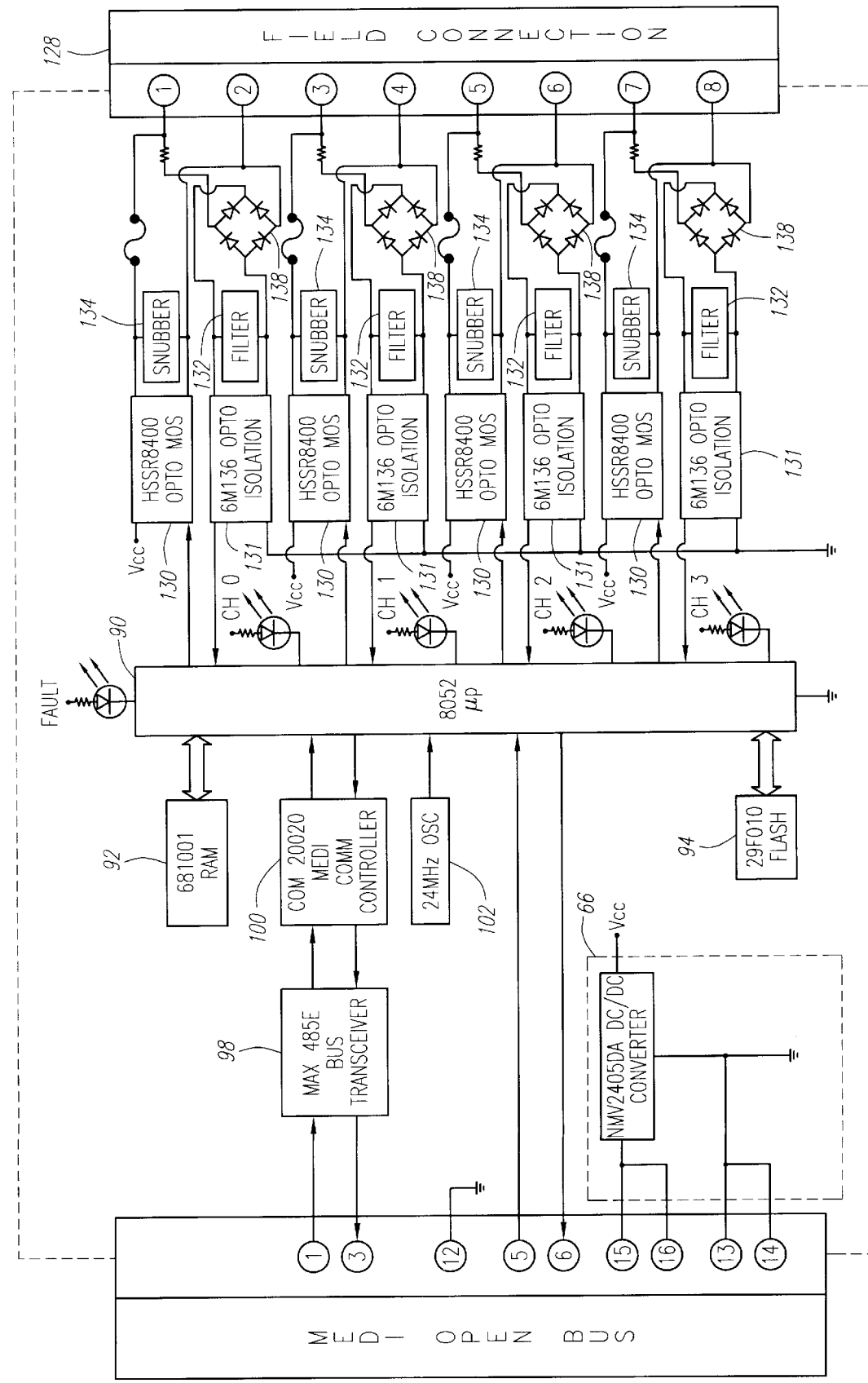
FIG. 6(c) is a block diagram illustrating the components of a zone device module having a digital input/output functionality.

Turning now to FIGS. 6(*a*)–6(*c*), each zone device module 22 preferably comprises a processor core including a 8052 microprocessor 90, RAM 92, and flash memory 94; a MEDI open bus interface including a MEDI open bus connector 96, a bus transceiver 98, and MEDI communications controller 100. Each zone device module 22 also includes a 24 MHZ oscillator 102 for providing a clock to the microprocessor 90, and a power supply network 104 for supplying Vcc and various reference voltages to the microprocessor 90.

Referring now, in particular, to FIG. 6(*a*), if the zone device module 22 is designed to function as an analog output device, an analog output real-word interface network 106 will be provided and connected to the microprocessor 90. The analog output real-world interface network 106 may include, for example, a field connector 108, a pair of analog signal conditioner circuits 110, a pair of digital-to-analog converters 112, and a pair of isolation bridge circuits 114.

If, on the other hand, the zone device module 22 is to function as an analog input device (shown in FIG. 6(*b*)), an analog input real-word interface network 116 will be provided and connected to the microprocessor 90. The analog input real-world interface network 116 may include, for example, a field connector 118, a pair of analog signal conditioner circuits 120, a pair of analog-to-digital converters 122, and a pair of isolation bridge circuits 124.

Finally, if the zone device module 22 is designed to function as a digital input/output device, a digital input/output real-world interface 126 may be coupled to the microprocessor 90 for enabling the microprocessor 90 to interact with one or more field elements (not shown). The digital input/output real-world interface 126 may include a field connection 128 capable of providing four digital communication channels CH0–CH3. Each channel may path may comprise a first isolation circuit 130, a second isolation circuit 131, a filter circuit 132, a snubber circuit 134, and a diode implemented bridge circuit 138. The structure and function of such circuits is believed to be well known in the art and is therefore not described in detail herein.

In view of the foregoing, those skilled in the art will appreciate that a zone device module 22 may take many forms. For example, a zone device module 22 may take the form of an analog input device (shown in FIG. 6(*b*)) capable of sensing thermocouples, RTDs, voltages, currents and the like. In such an embodiment, the intelligence of the zone device module 22 may be used for such functions as conversion of engineering units, linearization, filtering, alarming, totaling, denoting events/reactions, and taking peak, valley and average measurements. Further, as illustrated above, zone device modules 22 used as analog input devices may employ two factory-calibrated optically and galvanically isolated universal input channels, wherein each channel uses a 20-bit analog-to-digital converter to provide 14 bits of resolution and under/over range capability.

A zone device module 22 may also take the form of an analog output device (shown in FIG. 6(*a*)) capable of producing voltage and current signals. In such an embodiment, the intelligence of the zone device module 22 may be used for such functions as wave form generation, ramping, and noting events/reactions. A zone device module 22 used as an analog output device may employ two factory-calibrated optically and galvanically isolated universal output channels, wherein each channel uses a 14-bit digital-to-analog converter to provide 12 bits of resolution and under/over range capability.

Further, as has been demonstrated above, a zone device module 22 may take the form of a digital input device, digital output device or digital input/output device (shown in FIG. 6(*c*)). In such embodiments, the zone device module 22 preferably may include four optically isolated universal input and/or output channels CH0–CH3. For digital input functions, the intelligence of the zone device module 22 may be used for such functions as counting, pulse measurement, frequency measurement, latching, alarming, totaling, and noting events/reactions. For digital output functions, the intelligence of the zone device module 22 may be used for such functions as time proportional output generation, pulse generation, one shots, and noting events/reactions.

Those skilled in the art will recognize that zone device modules 22 in accordance with the present invention may be configured in any of a number of ways and that those configurations described above are but a few examples of how the devices may be put to use. Accordingly, the foregoing should not be considered in any way as a limitation on the scope of the invention described herein.

Preferred Implementation of a Zone Modular Rack

Figure 7A:
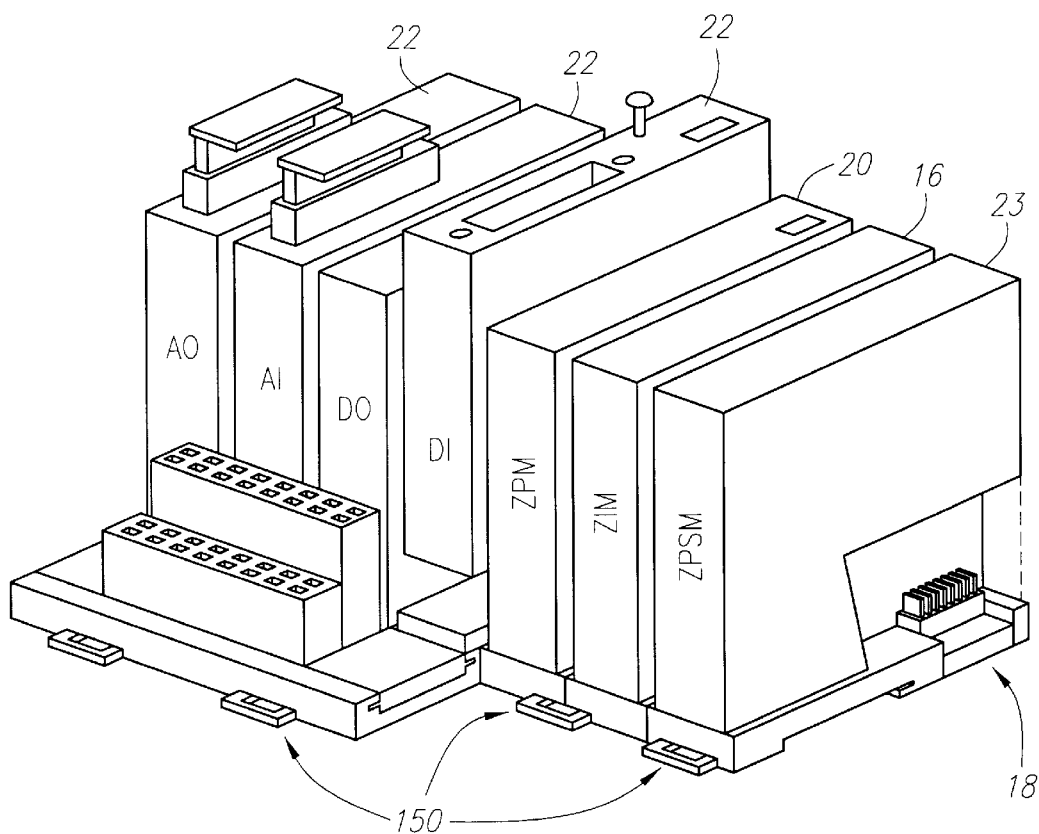
FIG. 7(a) is an illustration of a plurality of modules coupled to a zone modular rack in accordance with a preferred form of the present invention.

Turning now to FIGS. 7(*a*) and 7(*b*), the utilization of zone modular rack elements 150 in accordance with the present invention enable the creation of a new category of I/O packaging architecture called zone I/O. The use of a zone I/O architecture allows the components of a control system (for example control system 10 shown in FIGS. 2(*a*) and 2(*b*)) to be allocated in precisely the amount and layout required for a particular application without unnecessarily limiting the potential for system expansion or modification. For example, zone modular rack elements 150 are configured for attachment to one or more MEDI I/O components, such as zone interface modules 16, zone processor modules 20, zone device modules 22, and zone power supply modules 23. The zone modular rack elements 150 are available in binary size increments (i.e., 1, 2, 4, 8 and 16) such that no more than the required number of MEDI I/O modules need be used in any application.

Stated somewhat differently, one of the principal design features of a MEDI I/O system 10 in accordance with the present invention is modularity. Indeed, modularity gives a MEDI I/O system 10 the flexibility of a building block set. The use of a single form factor for the different MEDI I/O modules establishes a packaging standard, enabling different components or modules to plug into the system at virtually any location. This allows a variety of MEDI zone device modules 22 to be constructed into zones of I/O on an as needed basis and, accordingly, provides substantial system flexibility.

Figure 7B:
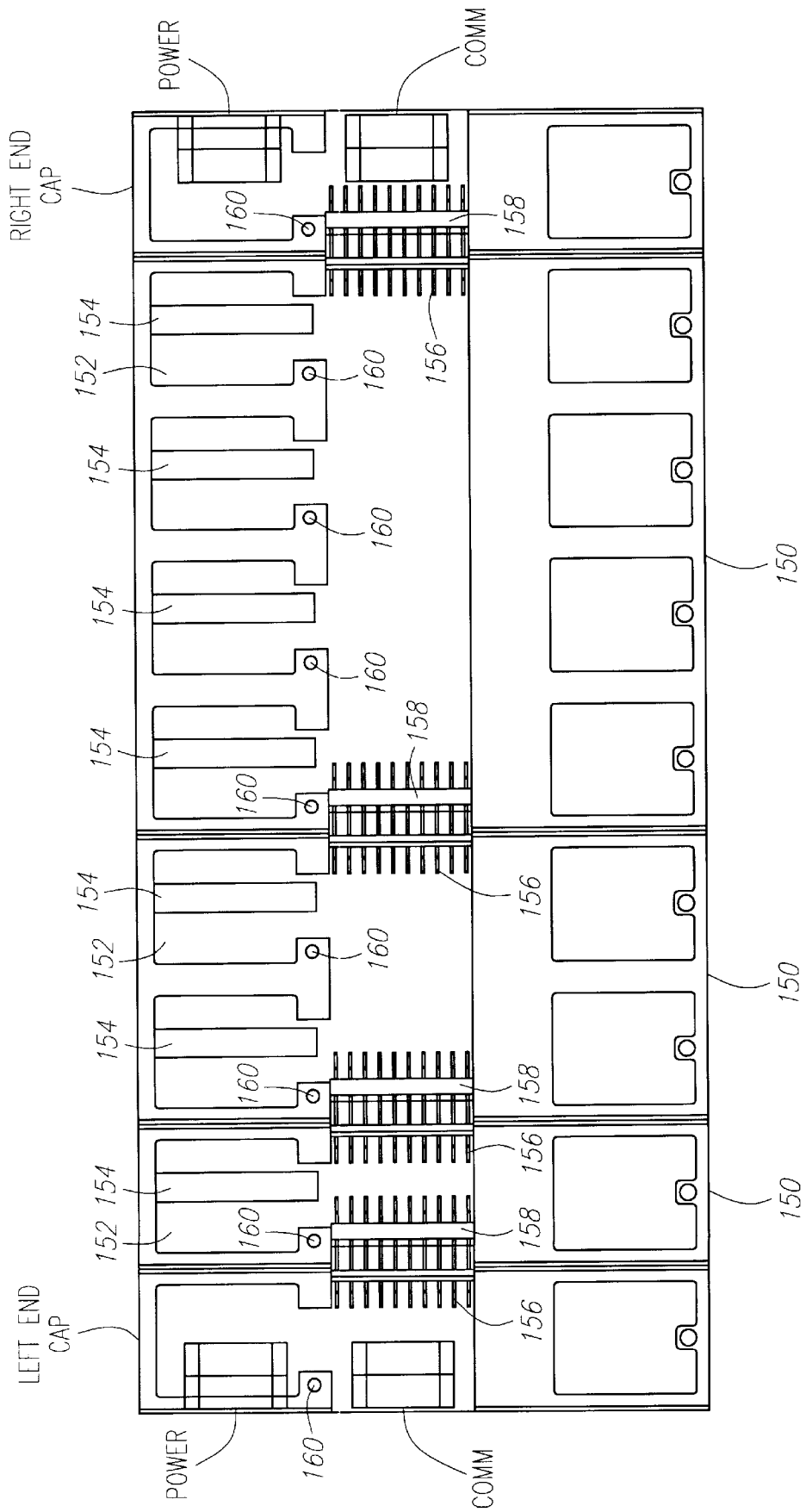
FIG. 7(b) is a PC board layout of a plurality of zone modular rack elements in accordance with the present invention.
Figure 8A:
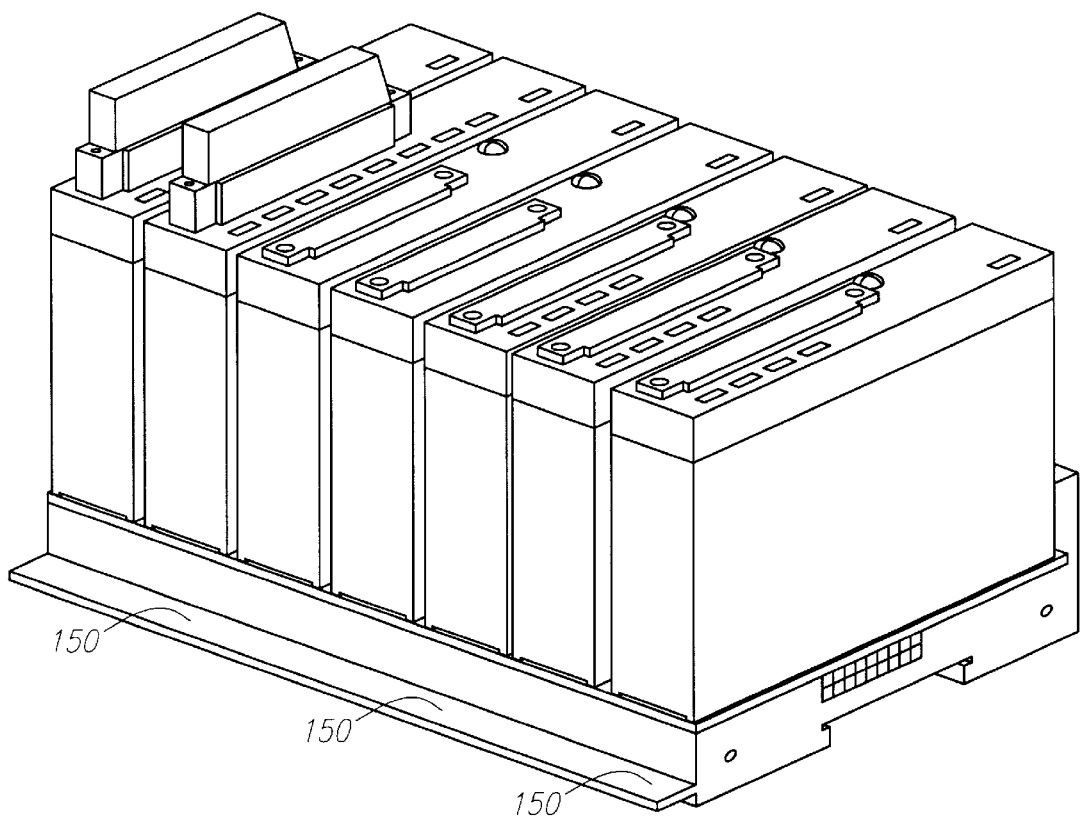
FIG. 8(a) is an illustration of a zone modular rack assembly and attached modules in accordance with the present invention.
Figure 8B:
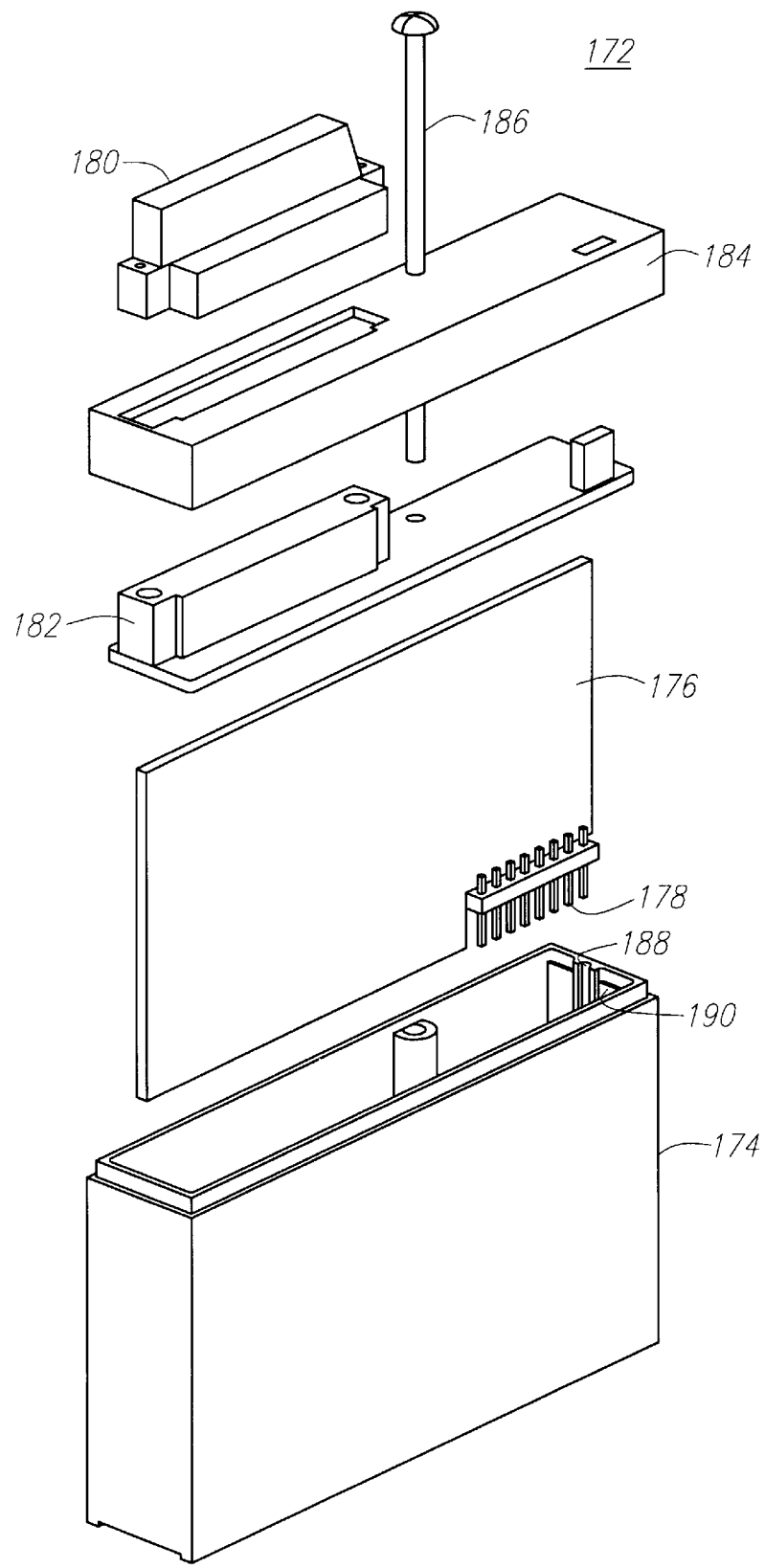
FIG. 8(b) is an exploded view of an exemplary object oriented hardware module in accordance with the present invention.

Now, turning to FIG. 7(b), each zone modular rack element 150 preferably comprises a PC board having provided thereon a repeater circuit network 152, a module connector 154 for engaging any of a number of MEDI I/O modules (zone interface modules 16, zone processor modules 20, zone device modules 22, zone power supply modules 23, etc.), a female inter-rack module connector 156, a male inter-rack module connector 158, and a receptor 160 for receiving a module hold down screw (shown in FIG. 8(b)). It may be noted that the male and female inter-rack module connectors 156 and 158 provide a means for making power and the MEDI open bus 18 available to the various MEDI I/O modules that may be coupled to a particular rack assembly. In a preferred form, each zone modular rack assembly (such as that shown in FIG. 7(b)) may include one or more zone modular rack elements 150 and a pair of end cap elements 162.

Further, in a preferred form each MEDI I/O component 16, 20, and/or 22 includes its own real-world interface connector 54, 108, 118 and/or 128. Those skilled in the art will realize that this implementation has several advantages. For example, it enables the use of common or open standard rack elements 150. It allows for MEDI compatible components to be plugged in virtually anywhere within a rack assembly, and it allows for proper field connectors to be incorporated into the specific MEDI I/O modules and/or MEDI products. Finally, the use of module oriented real-world interface circuits assures that unused terminals will be minimized and that MEDI components may be replaced safely and easily in the event that the interface circuits malfunction.

A zone modular rack assembly 170 having a plurality of MEDI I/O components mounted thereon is illustrated in FIG. 8(a). An exploded view of the physical elements comprising a typical MEDI I/O component 172 is provided in FIG. 8(b). As shown in FIG. 8(b), each MEDI I/O component 172 may include a side wall housing 174, a PC board 176 having a pin connector 178 provided thereon, a real-world interface connector 180, an interface board 182, a housing cap member 184, and a retention screw 186. The PC board 176 is configured to slideably engage a slot 188 formed in an inner wall 190 of the side wall housing 174, and may be held in place by the interface board 182 and housing cap member 184.

Figure 9B:
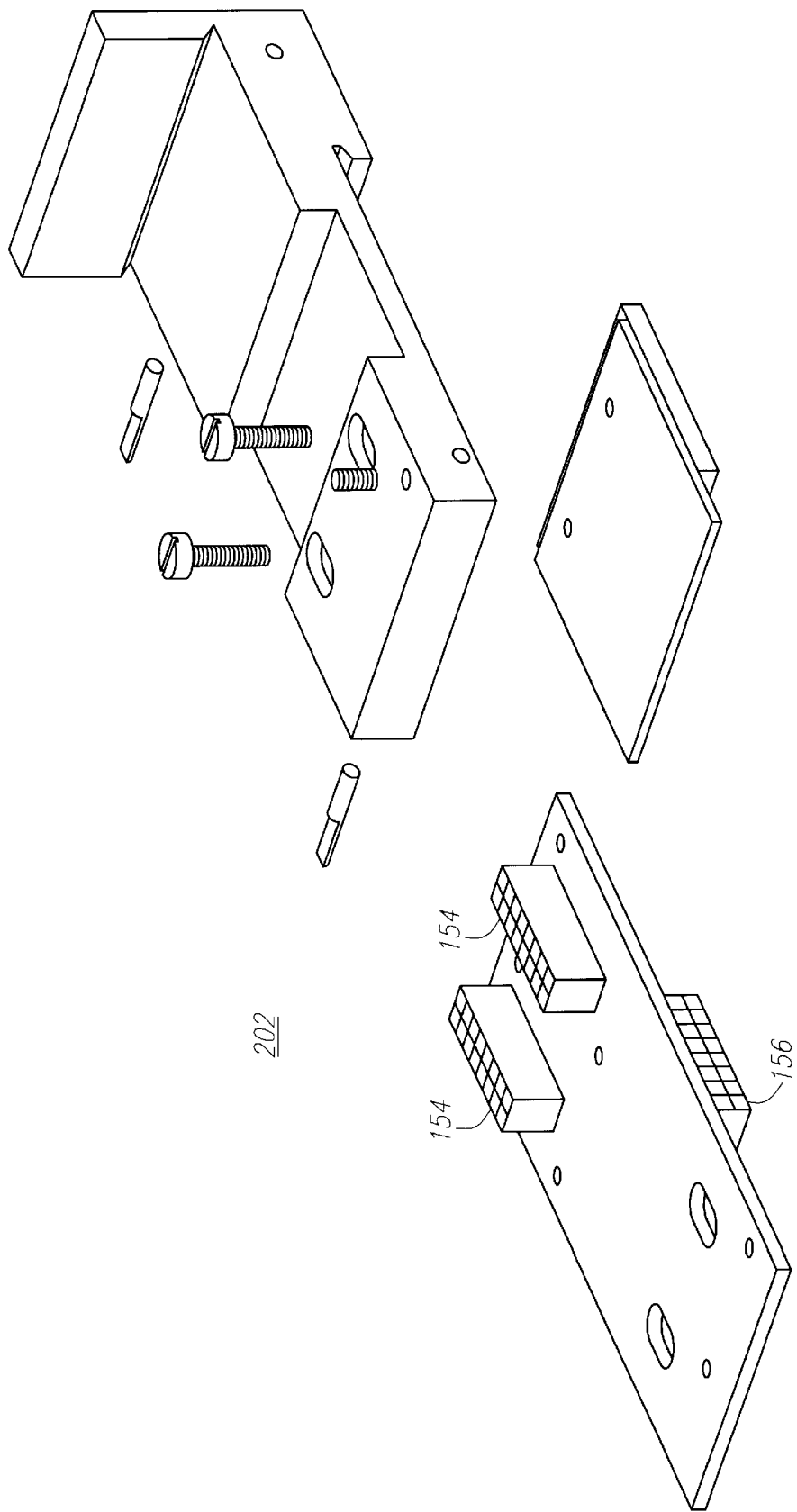
FIG. 9(b) is an exploded view of a two-position zone modular rack element in accordance with the present invention.

Exploded views of a single position zone modular rack element 200, a two position zone modular rack element 202, and a four position zone modular rack element 204 are provided in FIGS. 9(a)–9(c), respectively. The assembly of these elements is not described in detail herein as it is self-evident from the figures.

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A modular exception-based distributively intelligent I/O system comprising:

at least one central processing unit coupled to a communications network;

at least one zone interface module coupled to said communications network and to an open bus via a first open bus interface;

at least one zone processor coupled to said open bus via a second open bus interface; and at least one intelligent I/O module coupled to said open bus via a third open bus interface, said at least one intelligent I/O module including a processor core coupled to said third open bus interface and a universal I/O interface coupled to said processor core, said universal I/O interface enabling interaction between said processor core and at least one field element;

whereby, programming objects may be downloaded from said central processing unit to said at least one zone interface module, said at least one zone processor and said at least one intelligent I/O module to achieve distributive control within said modular exception-based distributively intelligent I/O system.

2. The modular exception-based distributively intelligent I/O system of claim 1, wherein said central processing unit comprises a personal computer.

3. The modular exception-based distributively intelligent I/O system of claim 1, wherein said at least one zone interface module, said at least one zone processor and said at least one intelligent I/O module are disposed within respective modular packaging elements that may be detachably connected to respective rack elements, said rack elements providing power to and communications links between said at least one zone processor module, said at least one zone processor and said at least one intelligent I/O module.

4. A method of decomposing a control application to achieve distributively intelligent processing within a control network, said method comprising the steps of:

dividing said control application into a hierarchy of zones;

assigning said zones to one of at least three levels including a central processor level, a process object level, and a device object level;

providing an exception base communication protocol between said at least three levels;

assigning said central processor level responsibility for managing an overall application within said control network;

assigning said process object level responsibility for process functions within said control network; and assigning said device object level responsibility for modeling functionalities of a plurality of field devices to be controlled by said control network;

wherein a plurality of devices comprising said process object level and said device object level are implemented using object oriented hardware elements.

* * * * *